United States Patent [19]
Keil et al.

[11] 4,418,980
[45] Dec. 6, 1983

[54] PLANAR WAVEGUIDE LENS, ITS UTILIZATION AND METHOD FOR ITS MANUFACTURE

[75] Inventors: Rudolf Keil, Munich; Franz Auracher, Baierbrunn; Michael Stockmann, Munich, all of Fed. Rep. of Germany

[73] Assignee: Siemens Aktiengesellschaft, Berlin & Munich, Fed. Rep. of Germany

[21] Appl. No.: 269,558

[22] Filed: Jun. 2, 1981

[30] Foreign Application Priority Data

Jun. 20, 1980 [DE] Fed. Rep. of Germany ....... 3023147

[51] Int. Cl.³ .............................................. G02B 5/174
[52] U.S. Cl. .............................. 350/96.13; 350/96.11; 350/96.14; 350/96.18
[58] Field of Search ............... 350/96.11, 96.12, 96.13, 350/96.14, 96.18, 96.31

[56] References Cited

U.S. PATENT DOCUMENTS

| | | | |
|---|---|---|---|
| 4,025,157 | 5/1977 | Martin | 350/96.18 |
| 4,027,946 | 6/1977 | Tsai | 350/96.12 |
| 4,258,978 | 3/1981 | Cole | 350/96.31 X |
| 4,273,445 | 6/1981 | Thompson et al. | 350/96.11 X |

OTHER PUBLICATIONS

Suematsu et al., "Focusing Properties of Thin-Film Lenslike Light Guide . . . ", *Appl. Phys. Lett.*, vol. 23, No. 2, Jul. 1973, pp. 78–79.
Cheng et al., "Novel Technique of Making Graded-Refractive-Index Slab Waveguides", *Electron. Lett.*, vol. 10, No. 15, Jul. 1974, pp. 315–316.
Wei et al., "Large Refractive Index Change Induced by Ion Implantation . . . ", *Appl. Phys. Lett.*, vol. 25, No. 6, Sep. 1974, pp.329–331.
Hatakoshi et al., "Optical Waveguide Lenses", *Optica Acta*, vol. 26, No. 8, Aug. 1979, pp. 961–968.
Anderson D. B. et al., "An Integrated-Optical . . . Transform", IEEE Journal of Quantum Electronics", vol. QE-13, No. 4, Apr. 1977, pp. 268–275.
Chen B. et al., "Diffraction-Limited Geodesic Lens . . . Circuit", IEEE J of Quantum Electronics, vol. QE-15, No. 9, Sep. 1979, pp. 853–860.
Zernike F., "Luneburg Lens for Optical Waveguide Use", Optics Communications, vol. 12, No. 4, Dec. 1974, pp. 379–381.
Yao S. K. et al., "Chirp-Grating Lens for Guided-Wave Optics", Appl. Phys. Lett. 33(7), Oct. 1, 1978, pp. 635–637.
Mikaélyah A. L., "SELFOC Dielectric Waveguides", Sov. J. Quantum Electron., vol. 7, No. 2, Feb. 1977, pp. 266–267.
Schiffner G., "Lichtleitfaser-Rotationssensor auf der . . . ", Seimens Forsch.-u. Entwickl.-Ber. Bd. 9 (1980) Nr. 1, pp. 16–25.
Verber C. M., "Integrated-Optical Data Processor", Laser Focus, Dec. 1979, pp. 68–69.
Barnoski M. K., "Introduction to Integrated Optics", Plenum Press, New York, London, pp. 127–165, 167–201, 315–470.

*Primary Examiner*—John D. Lee
*Attorney, Agent, or Firm*—Hill, Van Santen, Steadman & Simpson

[57] ABSTRACT

A planar waveguide lens is characterized in that the same is a gradient lens, whereby the refractive index profile transversely to the lens axis extends approximately parabolically. The lens may be constructed to be multi-mode or may be constructed to be single-mode in the spatial direction perpendicular to the lens axis and perpendicular to the axis in which the indicated change of the refractive index profile extends. Grid structures are provided for dividing the light. The grid structures may be permanent, electro-optically produced or acousto-optically produced. For single mode fibers, the grid structures are produced by acoustic surface waves, while for multi-mode fibers, the grid structures are produced by way of acoustical volume waves.

17 Claims, 13 Drawing Figures

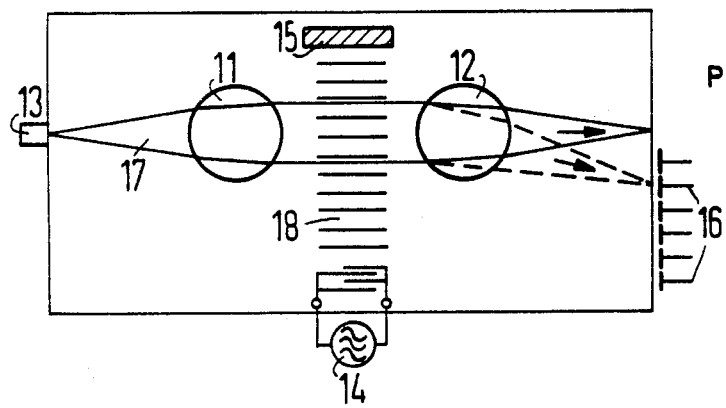
FIG 1
PRIOR ART
FIG 2
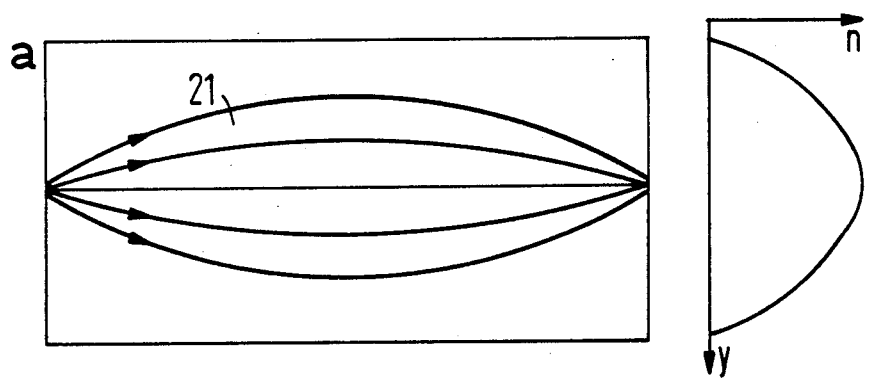
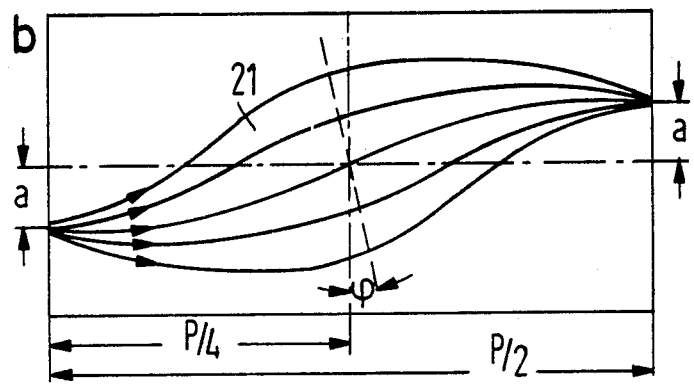

PLANAR WAVEGUIDE LENS, ITS UTILIZATION AND METHOD FOR ITS MANUFACTURE

BACKGROUND OF THE INVENTION

1. Field of the Invention

The present invention relates to a planar waveguide lens.

2. Description of the Prior Art

For many planar optical elements, lenses, embodied as a waveguide, are required. A representative example is an integrated optical spectrum analyzer, such as is described by D. B. Anderson et al in the IEEE, Journal of Quantum Electronics, QE-13 (1977), pp. 268–275. FIG. 1 illustrates such an integrated optical spectrum analyzer having two waveguide lenses. Here, the light coupled by a laser diode into the optical layer waveguide must be collimated with a first lens; the collimated light is then deflected through interaction with an acoustic surface wave, and, by means of a second lens (Fourier lens), again focused onto a detector row. A converter converts an applied a.c. voltage into the acoustic surface wave, which, in turn, is absorbed by an absorber. Since the deflection angle of the light is proportional to the frequency of the acoustic surface wave, the displacement of the focal spot on the detector row is likewise proportional to the acoustical frequency. The frequency analyzer, however, represents only one of many optical elements in which waveguide lenses are required.

Up to the present time, geodesic lenses (B. Chen and O. G. Ramer: IEEE, Journal of Quantum Electronics, QE-15 (1979), pp. 853–860), Luneberg lenses (F. Zernike: Opt. Commun. 12 (1974), pp. 379–381), and grid lenses (S. K. Yao and D. E. Thompson: Applied Physics Letters 33 (1978), pp. 635–637) have undergone testing as waveguide lenses. Although Luneberg lenses are relatively easy to manufacture, they are not suitable for substrates having a high refractive index, such as are frequently required. They therefore do not enter into consideration, for example for electrooptical substrates such as $LiNbO_3$ or $LiTaO_3$. Grid lenses and geodesic lenses are also suitable for highly-refractive substrates; however, in the case of grid lenses, strong imaging errors occur in the case of oblique incidence of light to the optical axis; geodesic lenses have the disadvantage that their reproducible manufacture and their accurate positioning relative to other components of the planar optical element (e.g. the detector row in the frequency analyzer) is very difficult.

SUMMARY OF THE INVENTION

The object of the present invention is to provide a planar waveguide lens which, for example, collimates light coupled in an optical layer waveguide, or which focuses the already collimated light, which can be simply manufactured and which does not exhibit the disadvantages set forth above with respect to the prior art.

According to the invention, the above object is achieved in that a planar waveguide lens is a gradient lens, whereby the refractive index profile transversely to the lens axis extends approximately parabolically. The imaging properties of this lens are illustrated in FIG. 2. FIG. 2a illustrates the path of light rays in the case of axial coupling in of light, while FIG. 2b illustrates the path of the light rays in the case of extra-axial coupling-in of light. Moreover, in FIG. 2a, the qualitative refractive index progression of the planar gradient lens is illustrated. Light rays which emanate from a point on the input side of the lens extend approximately sinusoidally about the lens axis with a period P (P designating the period of the light ray trace) independently of the angle of inclination of the light ray at the point of entry. Light rays which emanate from a point on the axis, after a distance P/4, extend axially parallel and are focused on the axis again at the distance P/2 (FIG. 2a). If the lens is excited in a punctiform manner outside of the axis, then the light rays, in the distance P/4 from the input, extend parallel, however inclined by an angle of $\phi$ with respect to the axis; after the distance P/2 they are again projected at the same distance a from the axis (FIG. 2b).

A parabolic refractive index profile yields imaging errors for large acceptance angles. If, by contrast, the planar gradient lens is so designed that the refractive index profile transversely of the lens axis behaves according to the relationship $$n(y) = n_o/\cosh(y/f)$$

where y is the distance from the lens axis transversely of the axis, $n_o = n(y=0)$ is the effective refractive index for $y=0$ and f is the focal length of the lens. Then, no imaging errors occur, even for random acceptance angles (A. L. Mikeaelyan: Soviet Jornal of Quantum Electronics 7 (1977) pp. 266–267). An advantage of this embodiment is that even the field curvature present in the case of geodesic and Luneberg lenses, is eliminated.

In the case of coupling a planar gradient lens to multimode fibers, it is advantageous that the planar gradient lens is multimode in the spatial direction perpendicular to the lens axis and perpendicular to the axis in which the indicated change of refractive index profile extends; otherwise, single-mode lenses are always preferable.

The favorable imaging properties of the planar gradient lens make possible the realization of numerous embodiments of the invention, which will be explained in detail below.

The utilization of the numerous planar optical elements constructed in accordance with the present invention shall likewise be explained in greater detail below.

The manufacture of the planar gradient lenses in accordance with the present invention, similarly to the manufacture of the Luneberg lenses, is possible through methods which are also set forth in greater detail below.

The above-discussed, approximately parabolic, profile of the effective refractive index of the waveguide lens must be observed very precisely. A similar change of the refractive index profile effects merely a change of the focal length; however, departures from the indicated form of the profile yield imaging errors which have a strong effect, particularly in the case of a large aperture ratio. Since different modes in a layer waveguide also have different effective refractive indices, different focal lengths result for the various modes.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic illustration of an integrated optical spectrum analyzer having two wave guide lenses according to the prior art;

FIG. 2 illustrates a planar gradient lens, in particular in FIG. 2a a lens with an axial light in-coupling and in FIG. 2b the case of extra-axial light in-coupling;

DESCRIPTION OF THE PREFERRED EMBODIMENTS

FIGS. 1 and 2 have been discussed above and will not be treated in further detail.

Figure 3:
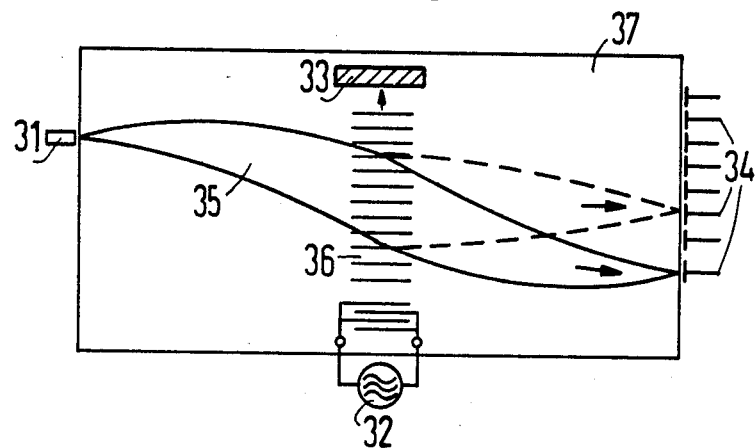
FIG. 3 illustrates an integrated optical spectrum analyzer having a planar gradient lens constructed in accordance with the present invention.

Referring to FIG. 3, a frequency analyzer is illustrated in which the two waveguide lenses 11, 12, required in the conventional design according to FIG. 1, are replaced by a single radiant lens 37. It is readily apparent that this structure avoids the problem of requiring the manufacture of two lenses which must be precisely positioned in relation to the other components of the spectrum analyzer. Moreover, in the case of this type of lens, no field curvature occurs, which is favorable for the coupling of the detector row 34. For the remainder, the method of operation of this spectrum analyzer is analogous to the method of operation of the spectrum analyzer of FIG. 1. The light 35, coupled by a laser diode 31 into the optical layer waveguide, is collimated by the gradient lens 37. Then, through interaction with the acoustic surface wave 36 emanating from a transducer 32 and extending in the direction of an absorber 33 the light is deflected and, finally, again by means of the gradient lens 37, focused on the detector row 34. The displacement of the focal stop on the detector row 34 is a measure of the acoustic frequency.

Figure 4:
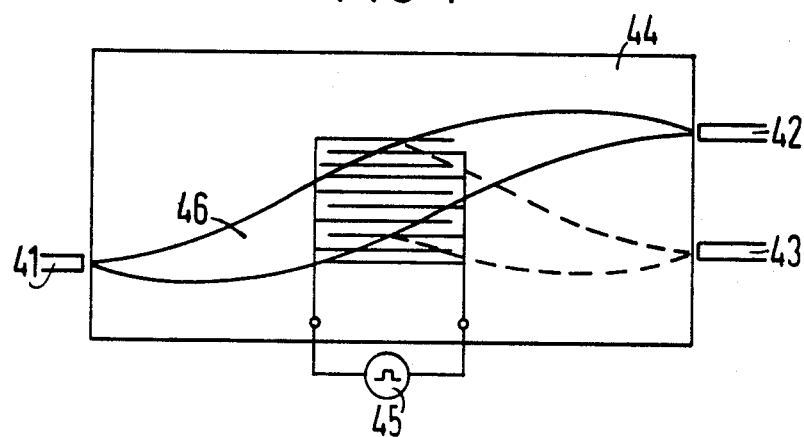
FIG. 4 illustrates a fiber transfer switch having an electro-optical Bragg deflector.

FIG. 4 illustrates a fiber transfer switch having an electro-optical Bragg deflector. The gradient lens 44 is manufactured, for example, through diffusion of titanium into a lithium niobate (LiNbO$_3$) crystal. By way of an interdigital device 45 having finger-shaped electrodes, and through the application of a voltage, a refractive index grid can be induced by which the light 46, coupled by an input fiber 41 into the optical layer waveguide, is Bragg-reflected. The gradient lens 44 then focuses the reflected light onto a fiber 43. Without the applied voltage, the light 46 is focused on the fiber 42.

Figure 5:
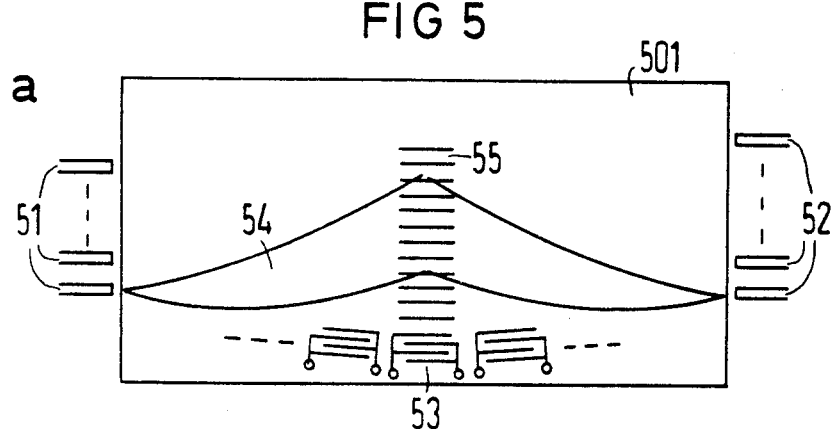
FIG. 5 illustrates an acousto-optical fiber transfer switch, in particular in FIG. 5a for single-mode fibers and in FIG. 5b for multi-mode fibers.
Figure 5:
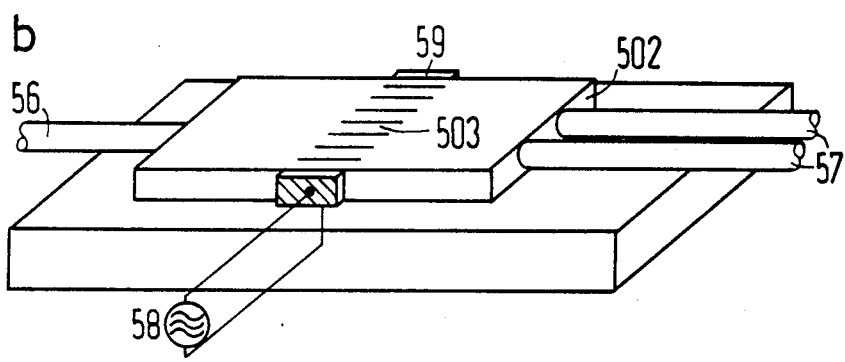

FIG. 5 illustrates fiber transfer switches in which the refractive index grid is acousto-optically produced. Through alteration of the frequency, one can then selectively switch over to one of the output coupling fibers 52, 57.

More specifically, FIG. 5a illustrates an acousto-optical fiber transfer switch for single-mode fibers. If single-mode fibers are to be coupled to the element, one then employs an acoustic surface wave 55. The light 54, coupled by one of the input coupling fibers 51 into the optical layer waveguide, is first collimated by the gradient lens 501, then, through interaction with the acoustic surface wave 55, produced by a sound transducer 53, the light is then deflected in the desired form, and finally focused by the gradient lens 501 onto one of the output coupling fibers 52.

FIG. 5b illustrates an acousto-optical fiber transfer switch for multi-mode fibers. The light coupled by the input coupling fiber 56 into the multi-mode optical waveguide 502 is first collimated by the gradient lens 502, then enters into interaction with an acoustical volume wave 503, brought about by a second transducer 58, and is then focused by the gradient lens 502 onto one of the output coupling fibers 57. Through the selection of the frequency of the acoustic volume wave 503 and extending in the direction of the absorber 59, it is determined on which of the output coupling fibers 57 the light is focused.

Figure 6:
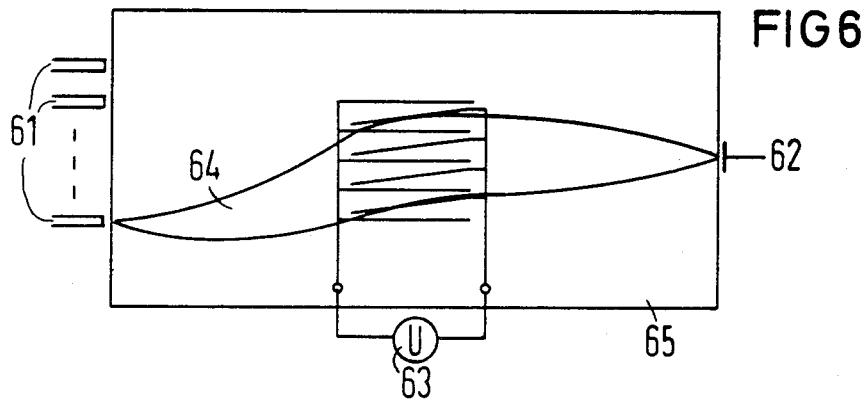
FIG. 6 schematically illustrates a data converter (parallel/series) having an electro-optical prism deflector.

FIG. 6 illustrates a data converter having an electro-optical prism deflector 63 in which the data are converted from parallel to series. One can selectively image one, respectively, of N inputs onto one output: The light 64, coupled by one of the input coupling fibers 61 into the optical layer waveguide 65, is collimated by the gradient lens 65, is then deflected by prism-shaped deflection regions electro-optically induced by the prism deflector 63, and is finally focused by the gradient lens 65 onto the detector 62.

Figure 7:
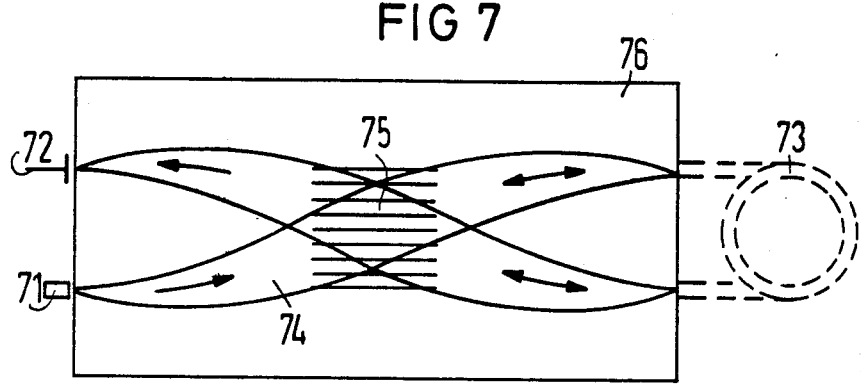
FIG. 7 schematically illustrates a fiber gyroscope having a fixed 3 dB divider.

FIG. 7 illustrates a fiber gyroscope (G. Schiffner: Siemens Research and Development Reports 9 (1980), pp. 16-25) having a fixed 3 dB divider. The light 74, coupled by a laser diode 71 into the optical layer waveguide 76, is first collimated by the gradient lens 76. It is then divided by a permanent grid structure 75 which acts as a fixed 3 dB divider. Following subsequent focusing of the divided beams by the gradient lens 76, the divided beams pass through a fiber coil 73. Divided beams returning from the fiber coil 73 are finally received on a detector 72. Depending upon length and modulation magnitude of the grid-shaped structure 75, one obtains a fixed division of the light over the output wave guides.

Figure 8:
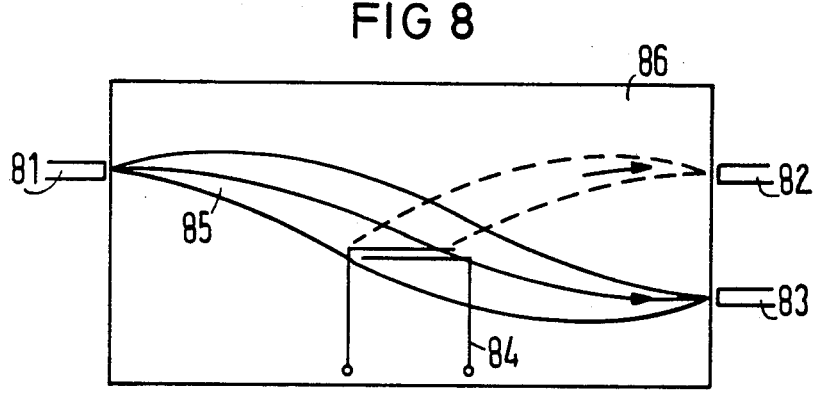
FIG. 8 illustrates a switchable branch for fibers.

FIG. 8 illustrates an alternative embodiment of a switchable branch in an electro-optical substrate. The light 85 coupled by an input coupling fiber 81 into the optical layer waveguide 86, is entirely or partially reflected if a refractive index jump is induced through the application of a voltage to the electrodes 84. The reflected light is imaged onto the output 82. If voltage is not applied to the electrodes 84, then the light 85 is completely imaged onto the output 83.

Figure 9:
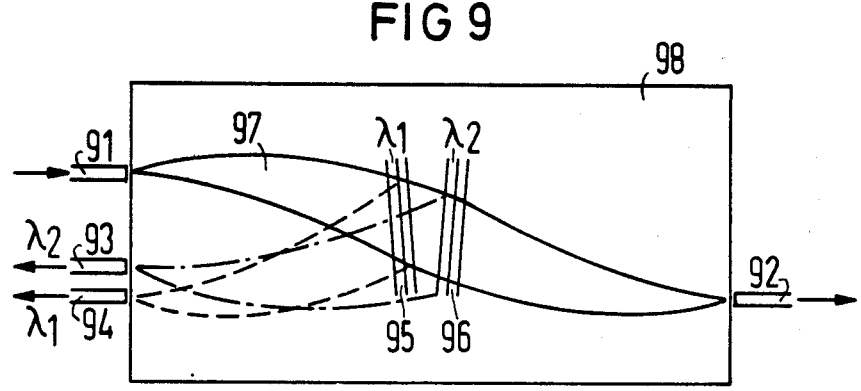
FIG. 9 illustrates a wavelength-selective beam divider.

FIG. 9 illustrates an additional embodiment having a fixed reflection grid. Since the reflectivity of a grid is dependent upon the wavelength of the light, it is also possible to produce wavelength-selective branches with this arrangement. Through the arrangement in series of several mutually-inclined grids 95, 96 with different grid constants, several wavelengths can be focused onto different locations 93, 94 of the input side. The light 97, coupled by an input coupling fiber 91 into the layer waveguide 98 is divided in this manner at the grid structures 95 and 96. Depending upon the wavelength, the divided beams are imaged onto the outputs 93 and 94, while the remainder of the light is imaged onto the output 92.

Figure 10:
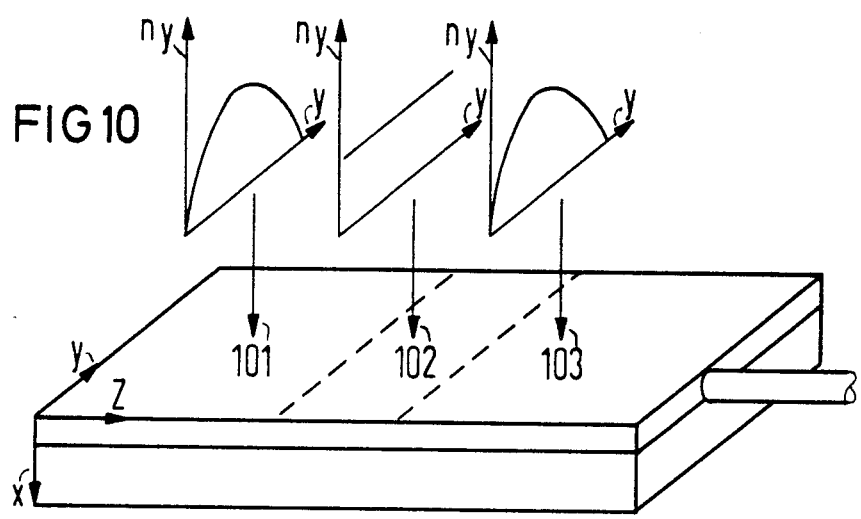
FIG. 10 illustrates a planar gradient lens having a constant refractive index progression in its central region.

FIG. 10 illustrates a planar gradient lens having a constant refractive index progression in its central region 102, whereas the terminal regions 101 and 103 exhibit approximately parabolic refractive index progressions. In the case of a planar gradient lens, in order to have sufficient room for the grid structures without impairing the imaging properties of the gradient lens, it is possible to produce, in the region of the grid structure, a waveguide region 102 having a constant refractive index.

Figure 11:
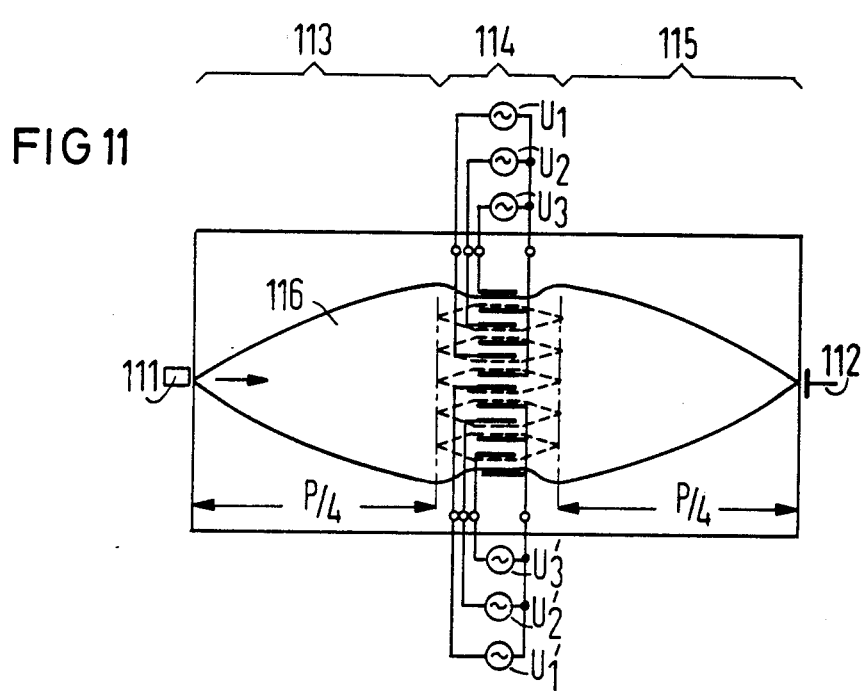
FIG. 11 illustrates an element for signal recognition.

FIG. 11 illustrates an electro-optical element which can serve the purpose, for example, of signal recognition (C. M. Verber: Laser Focus, December 1979, pp. 68–69). The light 116 emanating, for example, from a laser 111 is collimated in the gradient lens region 113 and, in the region 114, via tapered transitions, which are designed in a manner known to those skilled in the art, the light 116 is concentrated on 2×N strip waveguides. By way of electrodes it is now possible to bring about, in the strip waveguides 1-N, phase shifts corresponding to a reference signal. If voltages corresponding to the signal to be analyzed are applied to the electrodes 1'-N', then corresponding phase shifts result in the waveguides 1'-N'. Now all known reference signals can be chronologically successively connected to the electrodes 1-N. The phase-shifted partial waves of the light are superimposed in the detector plane via expanding tapers and via the gradient lens region 115 and brought to interference. If the reference signal corresponds to the unknown signal, a maximum output intensity results at the detector 112 (structural interference). However, advantageously, in the waveguides 1-N for the reference signal, an additional phase shift of $\pi/2$ will be provided so that, in the case of correspondence of the unknown signal with a reference signal, a minimum results at the detector output 112.

Components of this type can also be employed, for example, for the automatic position recognition of a mask in relation to the substrate (with the aid of adjustment marks). Since N signals are simultaneously compared, a very rapid processing of the signals results.

Various techniques may be employed in making a planar waveguide lens of the type set forth herein which comprises an optical waveguide layer and a refractive index gradient which has an approximately parabolic profile transversely of the longitudinal axis of the lens, in which an optical layer of predetermined thickness profile and predetermined refractive index profile is applied onto a carrier by sputtering-on the optical layer or by vapor depositing the optical layer. A shadow mask may be positioned over the carrier and the optical layer applied through the mask, or a variable, chronologically-controlled diaphragm may be positioned relative to the carrier and the diaphragm may be controlled during the setting of the refractive index profile.

The waveguide may be manufactured by providing an optical substrate, such as $LiNbO_3$ or $LiTaO_3$ and titanium may be controllably diffused into the substrate to set the reactive index profile. Also, the optical substrate may be variably dosed by ion implantation to set the refractive index profile.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A planar waveguide lens for a frequency analyzer, comprising:
   an optical waveguide layer including an input end for receiving light, a longitudinal axis, an output end for emitting light, including a plurality of output locations, and an approximately parabolic refractive index gradient extending transversely of the axis; and
   an acoustic surface wave generator connected to said optical layer and selectively operable to produce acoustic waves transversely to said optical layer to deflect the light so that said layer selectively images the light at corresponding selected output locations along said output end in accordance with the acoustic frequency.

2. A planar waveguide lens transfer switch comprising:
   an optical waveguide layer including an input end for receiving light, a longitudinal axis, an output end for emitting light, and an approximately parabolic refractive index gradient extending transversely of the axis; and
   Bragg deflection means connected to said layer and operable to induce a refractive index grid to switch the light from a first imaging spot on said output end to a second imaging spot on said output end.

3. The transfer switch of claim 2, wherein:
   said optical layer comprises a lithium-niobate body and titanium diffused into said body.

4. The transfer switch of claim 2, wherein:
   said Bragg deflection means comprises a pair of terminals for receiving a voltage, and an interdigital electrode structure on said layer and connected to said terminals.

5. A planar waveguide lens transfer switch for single-mode fibers, comprising:
   an optical waveguide layer including a longitudinal axis, an input end for receiving light, an output end for emitting light at at least two spaced output locations, and an approximately parabolic refractive index gradient extending transversely of the axis; and
   acoustic surface wave generating means on the layer and operable to deflect the light to a selected output location.

6. A planar waveguide lens transfer switch for multi-mode fibers, comprising:
   an optical waveguide layer including a longitudinal axis, an input end for receiving light, an output end for emitting light at at least two spaced output locations, and an approximate parabolic refractive index gradient extending transversely of the axis; and
   acoustic volume wave generating means on the layer and operable to deflect the light to a selected output location.

7. A planar waveguide lens parallel/series data converter, comprising:
   an optical waveguide layer including a longitudinal axis, an approximately parabolic refractive index gradient extending transversely of the axis, an output end having an output location for emitting light, and an input end having a plurality of input locations for receiving light; and deflection means on said layer and operable to sequentially receive light from said input locations and deflect the same to said output location.

8. The data converter of claim 7, wherein said deflection means comprises:

electro-optical prism means for inducing prism-shaped deflection regions in said layer.

9. The data converter of claim 8, wherein said electro-optical prism means comprises:

an interdigital electrode structure on said layer, and terminals connected to said structure for receiving voltages.

10. A planar waveguide lens device, comprising:

an optical waveguide layer including a longitudinal axis, an approximately parabolic refractive index profile extending transversely of said axis, a first end including a first location for receiving light and second and third locations for emitting light, and a second end including a fourth location for emitting light; and first and second mutually inclined reflection grids having respective different grid constants such that light of a first wavelength is reflected by said first grid toward said second location, light of a second wavelength is reflected by said second grid towards said third location, and light of at least one other wavelength is imaged on said fourth location.

11. A planar waveguide lens signal recognition device, comprising:

an optical waveguide layer including a longitudinal axis, an approximately parabolic refractive index profile extending transversely of the axis, an input side comprising an input end including an input location for receiving light, and an output side comprising an output end including an output location for emitting light;

a central section between said input and output sides;

a plurality of tapered transitions connecting said central section to said input and output sides;

2×N strip waveguides carried on said central section and having 1-N and 1'-N' electrodes, the 1'-N' electrodes to receive an unknown frequency signal to cause respective phase shifts of the light of the respective strip waveguides and the 1-N electrodes to sequentially receive known reference frequency signals to cause respective phase shifts, so that the intensity of light output at said output location indicates the frequency of the unknown signal.

12. A planar waveguide lens, comprising:

an optical waveguide layer for carrying light, including a longitudinal axis and a refractive index gradient which is approximately parabolic and which extends transversely of the longitudinal axis, said waveguide layer including a plurality of light impingement locations and a plurality of light output locations;

said lens including grid means for providing a grid structure which is effective to divide light; and said grid means comprising electro-optical means operable to electro-optically produce the grid structure and selectively controllable to provide separation of the light from selected impingement locations to selected output locations.

13. A planar waveguide lens, comprising:

an optical waveguide for carrying light, including a longitudinal axis and a refractive index gradient which is approximately parabolic and which extends transversely of the longitudinal axis, said waveguide layer including a plurality of light impingement locations and a plurality of light output locations;

said lens including grid means for providing a grid structure which is effective to divide light; and said grid means comprising acousto-optical means operable to acousto-optically produce the grid structure and selectively controllable to provide separation of the light from selected impingement locations to selected output locations.

14. The planar waveguide lens of claim 13, wherein:

for coupling single-mode fibers, said acousto-optical means is connected to said lens to produce acoustic surface waves.

15. The planar waveguide lens of claim 13, wherein:

for coupling multi-mode fibers, said acousto-optical means is connected to said lens to produce acoustic volume waves.

16. A planar waveguide lens, comprising:

an optical waveguide layer for carrying light including a longitudinal axis and a refractive index gradient which is approximately parabolic and which extends transversely of the longitudinal axis, said waveguide layer including a plurality of light impingement locations and a plurality of light output locations; and means for electro-optically inducing prism-shaped deflection regions for deflecting the light and selectively controllable to provide separation of the light from selected impingement locations to selected output locations.

17. A planar waveguide lens, comprising:

an optical waveguide layer for carrying light, including a longitudinal axis and a refractive index gradient which is approximately parabolic and which extends transversely of the longitudinal axis, said waveguide layer including a plurality of light impingement locations and a plurality of light output locations; and an electro-optical substrate and electrodes on one portion of said substrate for receiving selected voltages, said one portion of said substrate responsive to the respective selected voltages to provide a respective refractive index jump for reflecting at least a portion of the light from a selected light impingement location to a selected light output location.

* * * * *